Oct. 18, 1960 R. M. WEISSMAN 2,956,748

DIGITAL SUBTRACTOR

Filed Aug. 8, 1956 3 Sheets-Sheet 1

Inventor:
Richard M. Weissman
By Robert F. Mitchell, Jr. Atty.

Inventor:
Richard M. Weissman
By Robert F. Mueller Atty.

Oct. 18, 1960 R. M. WEISSMAN 2,956,748

DIGITAL SUBTRACTOR

Filed Aug. 8, 1956 3 Sheets-Sheet 3

Inventor:
Richard M. Weissman
By Robert F. Michler Jr. Atty.

1

2,956,748

DIGITAL SUBTRACTOR

Richard M. Weissman, Chicago, Ill., assignor to Bell & Howell Company, Chicago, Ill., a corporation of Illinois Filed Aug. 8, 1956, Ser. No. 602,764

13 Claims. (Cl. 235—176)

This invention relates to a system for performing a digital subtracting operation. Systems of this type have heretofore been proposed, using reversible binary scalers, reversible glow counters or scalers, or electro-mechanical devices. Such systems leave much to be desired. In particular, they require either a large number of components or specially constructed devices, have a slow speed of operation or are critical in operation.

It is an object of this invention to provide a digital subtracting system which is constructed of a relatively small number of standard components, has a high speed of operation, is stable, and is flexible and readily applied to different types of computer systems.

In the system of this invention, a number of pulses corresponding to the complement of a particular number (with reference to scale capacity) are applied to a counter or scaler which will then indicate the true summation of the number initially stored therein, if any, minus said particular number. Thus a subtracting operation is performed without requiring a reversible binary or glow counter or the like.

According to an important feature of the invention, a number of pulses corresponding to the complement of a particular number are applied by providing a second counter or scaler which stores the particular number and a pulse generator which is rendered operative to apply pulses to both scalers until the second scaler reaches its capacity. The number of pulses required to make the second scaler reach its capacity is equal to the complement of the particular number stored therein and since these pulses are also applied to the first scaler, it will indicate the true summation of the number initially stored therein minus the number stored in the second scaler.

One application of this arrangement is in a digital subtractor, although other applications are possible as will be described. To perform a digital subtraction, the first and second scalers are respectively connected to plus and minus count inputs. The subtraction can be performed on receipt of a command signal or the system may be set for continuous subtraction. A further important feature of the invention is in the provision of means for accepting and storing either a plus or minus count at any time without interference between the counting and subtracting functions.

According to other important features of the invention, the various functions are performed by circuits which are simple and straightforward in design and require a minimum number of component elements, and are stable and reliable in operation. Furthermore, the function of subtracting may be alone using any standard scaler without internal modifications.

Figure 1:
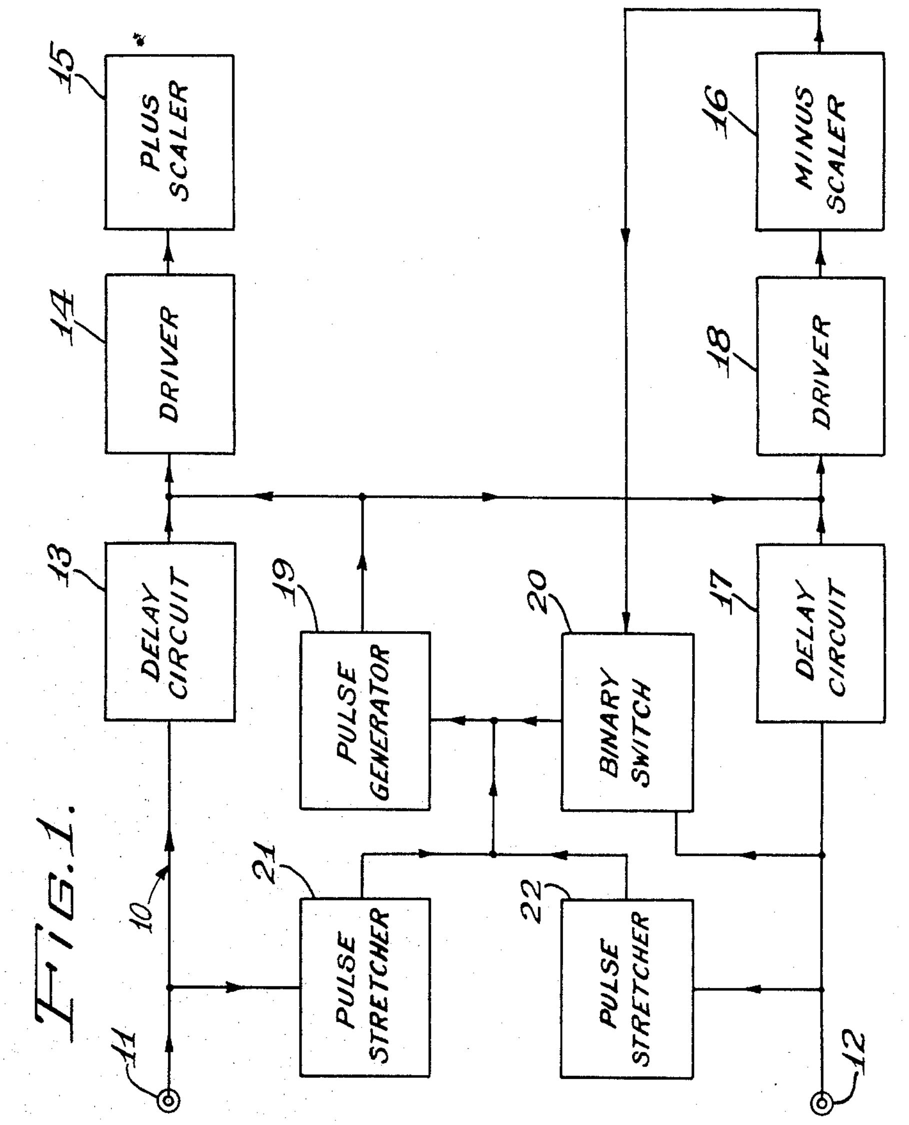

This invention contemplates other and more specific objects, features and advantages which will become more fully apparent from the following detailed description taken in conjunction with the accompanying drawings which illustrate performed embodiments and in which:

Figure 1 is a block diagram of a digital subtracting circuit constructed according to the principles of this invention;

2

Figure 2:
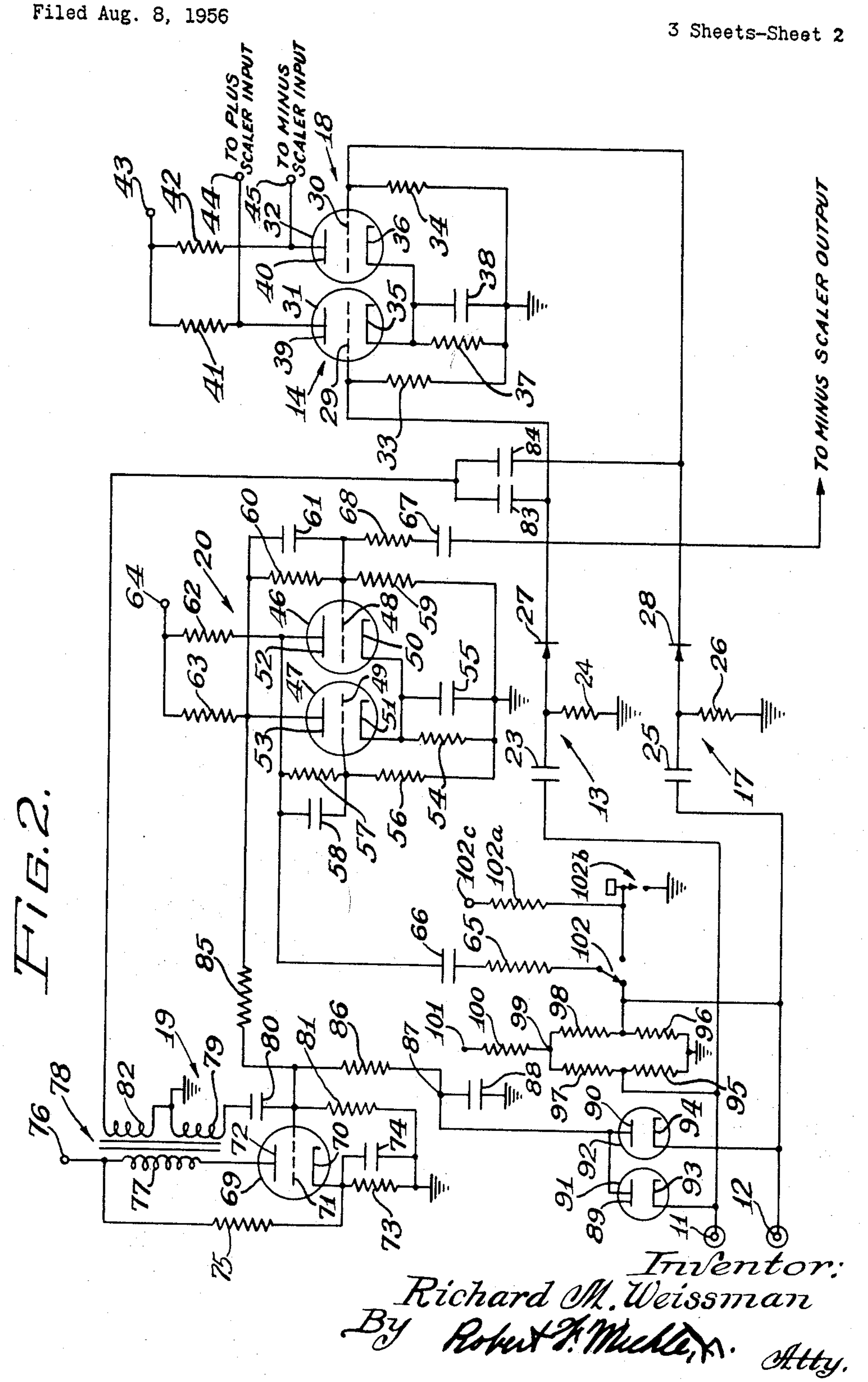
Figure 3:
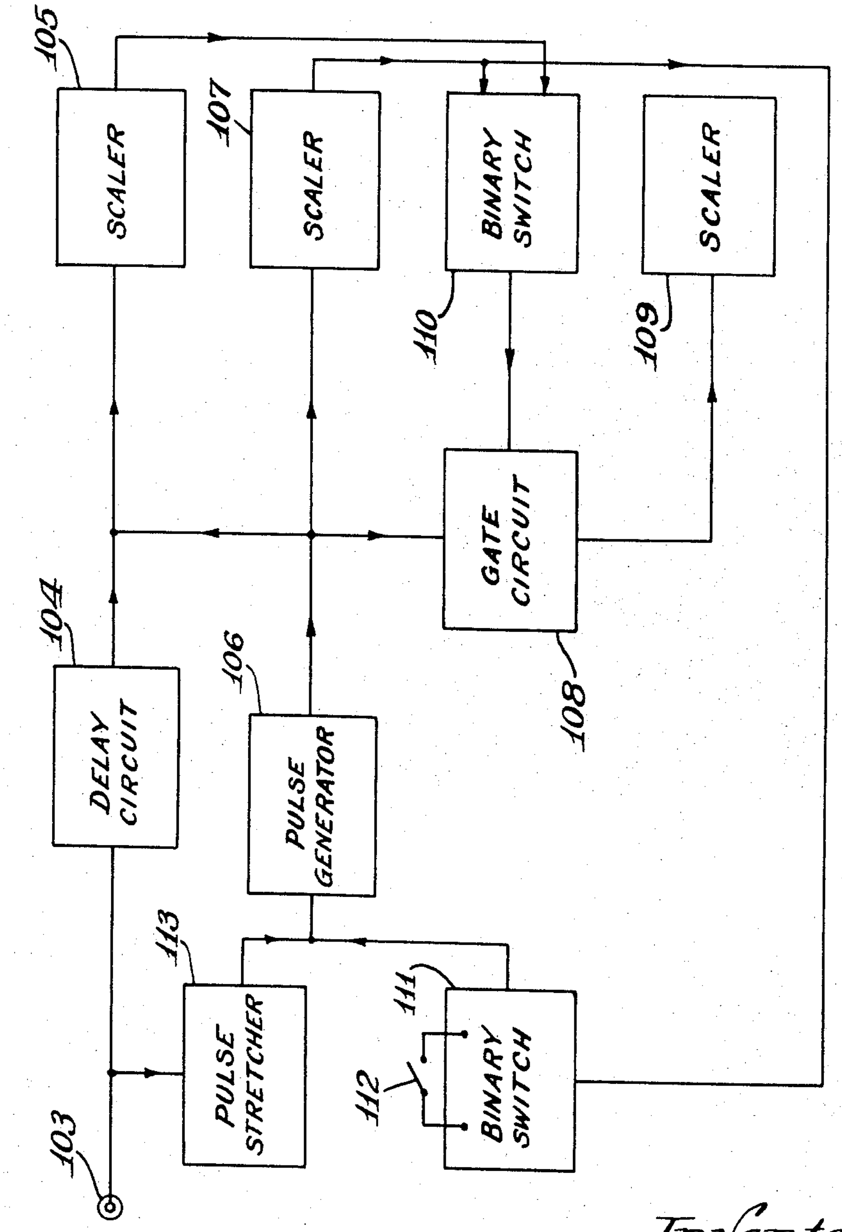

Figure 2 is a circuit diagram of the circuit shown in block form in Figure 1; and Figure 3 is a block diagram of a circuit for transferring a number from one independent scaler to another.

Referring to Figure 1, reference numeral 10 generally designates a digital subtracting circuit constructed according to the principles of this invention. The circuit 10 comprises two jacks 11 and 12 respectively arranged to be connected to sources of plus count pulses and minus count pulses. The plus count input jack 11 is connected to the input of a delay circuit 13 the output of which is applied to the input of a driver 14 with the output of the driver 14 being applied to the input of the scaler 15. The minus count input jack 12 is similarly connected to a scaler 16 through a delay circuit 17 and a driver 18.

The scalers 15 and 16 may operate on the decimal, the binary or any other desired system and may take any of the forms known in the art. Each scaler may, for example, operate on the decimal system and include a plurality of sections each having four bi-stable or flip-flop circuits. The first section stores numbers from 1 to 9 and then recycles to its initial or "zero" condition, a pulse being applied to the second section when the first section recycles. With three sections, each scaler has a capacity of 1000. Lights or other indicating devices may be energized to indicate the condition of the flip-flop circuits and hence the numbers which are stored.

A pulse generator 19 has an output connected to the inputs of both drivers 14 and 18. The pulse generator 19 is controlled by a binary switch 20. When a signal is applied to the binary switch 20, the pulse generator 19 is rendered operative to apply pulses to both drivers 14 and 18 to apply the pulses to both of the scalers 15 and 16. The output of the scaler 16 is applied to an input of the binary switch 20 to discontinue operation of the pulse generator 19 when the scaler 16 recycles.

To illustrate the operation of the system, suppose that the scalers 15 and 16 each have a capacity of 1000 and suppose that a number such as 600 is stored by the scaler 15 with a number such as 400 stored by the scaler 16. A signal may then be applied to the binary switch 20 to render the pulse generator 19 operative and it will apply pulses until the scaler 16 recycles. Thus 600 pulses will be applied through the driver 14 to the scaler 15. After 400 of the 600 pulses, the scaler 15 will recycle and after 600 pulses, the scaler 15 will store the number 200 which is the difference between the 600 initially stored by the scaler 15 and the 400 initially stored by the scaler 16. Thus a subtraction operation is performed without any reversible scalers.

A command signal may be applied to the binary switch 20 only when desired, or the input of the switch 20 may be connected to the minus count input jack 12 as illustrated to perform the subtraction whenever a minus count pulse is received, to thus provide a continuous subtraction operation.

An important feature of the invention resides in the provision of means for preventing interference between the counting and subtracting functions. According to this feature, each count signal is caused momentarily to stop the pulse generator while the count signal is applied to the scaler. For this purpose, the input of the pulse generator 19 is connected to the outputs of a pair of pulse stretcher circuits 21 and 22 having inputs connected to the jacks 11 and 12. The circuits 21 and 22 function to temporarily discontinue operation of the pulse generator 19 whenever a pulse is received at either of the inputs.

The delay circuits 13 and 17 serve to insure that the pulse generator 19 will be cut-off before the count signals are applied to the scalers.

To illustrate the operation of the system, suppose that the scalers 15 and 16 each have a capacity of 1000 and that the number 600 is stored by the scaler 15. If the minus count pulse is now received at the jack 12, it will be applied to the pulse stretcher 22, the binary switch 20 and the delay circuit 17. Application of the pulse to the pulse stretcher 22 will prevent operation of the pulse generator 19 for a certain length of time. Application of the pulse to the binary switch 20 will so condition the switch as to cause operation of the pulse generator 19 when the output from the pulse stretcher 22 is discontinued. Application of the pulse to the delay circuit 17 will cause application of a pulse to the scaler 16 after a short interval of time. The scaler 16 will then store the number 1. After the pulse generator 19 starts to operate, it will apply pulses until the scaler 16 recycles, hence 999 pulses. After 400 pulses, the scaler 15 will recycle and after 999 pulses, the scaler 15 will store the number 599.

The accuracy of the operation will not be affected by receipt of a plus or minus count at any time. If, in the above example, a minus count is received after 200 pulses from the pulse generator, the pulse generator will be temporarily cut-off by a signal from the pulse stretcher 22 and after the delay through the circuit 17, sufficient to insure that the pulse generator has discontinued operation, the pulse will be applied to the scaler 16 which, instead of registering 201 pulses will now register 202 pulses. Only 798 pulses will now be required to recycle the scaler 16. The next 200 will cause recycling of the scaler 15 and the scaler 15 will register the remaining 598 pulses. Thus the scaler 15 initially registered 600 and with the application of 2 minus count pulses, the scaler 15 will register 598.

A plus count signal will similarly cause a temporary cut-off of the pulse generator 19 and will not affect the accuracy of the operation.

Referring now to Figure 2, the plus and minus count input jacks 11 and 12 are connected to the delay circuits 13 and 17 which are of very simple design, yet stable and reliable in operation. The delay circuit 13 comprises a capacitor 23 connected in series with a resistor 24 between the jack 11 and ground and the circuit 17 similarly comprises a capacitor 25 connected in series with the resistor 26 between the jack 12 and ground. Each of these circuits has a short time constant so as to perform a differentiating action. When a negative-going pulse is applied to either circuit, a sharp negative-going peak will be produced by the leading edge of the input pulse and a positive-going peak will be produced by the trailing edge of the input pulse. The positive peak is thus delayed with respect to the leading edge of the input pulse by a time interval approximately equal to the duration of the pulse. Under normal circumstances, this delay is sufficient to insure that the pulse generator has been rendered inoperative. Accordingly, by applying only the positive peak to the drivers, the proper delay operation is obtained. For this purpose, the junction between the capacitor 23 and resistor 24 and the junction between the capacitor 25 and the resistor 26 are respectively connected through diodes 27 and 28 to control grids 29 and 30 of tubes 31 and 32 forming the driver stages 14 and 18. The polarity of connection of the diodes 26 and 28 is such that only the positive peaks are applied to the grids 29 and 30.

To provide a direct-current conduction path, the grids 29 and 30 are connected through resistors 33 and 34 to ground. Cathodes 35 and 36 are connected through a common bias resistor 37 to ground with a by-pass capacitor 38 in parallel with the resistor 37. The tubes 31 and 32 have plates or anodes 39 and 40 respectively connected through resistors 41 and 42 to a circuit point 43 which is connected to a source of high positive potential relative to ground. Such source is not shown since it is well known in the art. The plates 39 and 40 are also connected to terminals 44 and 45 which are connected to the inputs of the scalers 15 and 16.

It will be appreciated that when a negative-going pulse is applied to either of the input jacks 11 or 12, the differentiating circuits 13 and 17 and the diodes 27 and 28 function to apply positive pulses to the grids 29 and 30 at the trailing edges of the input pulses. When the positive pulses are applied to the grids 29 and 30, the plates 39 and 40 will be swung in a negative direction to apply negative pulses to the input of the scalers 15 and 16.

The binary switch 20 comprises two triodes 46 and 47 respectively having grids 48 and 49, cathodes 50 and 51 and plates or anodes 52 and 53. The cathodes 50 and 51 are connected through a common resistor 54 to ground with a by-pass capacitor 55 across the resistor 54. The grid 49 is connected through a resistor 56 to ground and through a resistor 57 to the plate 52 with a capacitor 58 in parallel with the resistor 57. The grid 48 is connected through a resistor 59 to ground and through a resistor 60 to the plate 53 with a capacitor 61 in parallel with the resistor 60. The plates 52 and 53 are respectively connected through resistors 62 and 63 to a circuit point 64 which is connected to a source of high positive potential relative to ground.

The operation of the circuit of the switch 20 is such that when either of the triodes 46 and 47 conducts, the other will be cut-off, to remain cut-off until a pulse is applied to reverse the condition. When conditions are such that no input signals have been received for a substantial length of time, the triode 46 will have been cut-off by the minus scaler output pulse and the triode 47 will remain in a conducting state. The minus count input jack 12 is connected through a resistor 65, through a capacitor 66 and through the parallel combination of resistor 57 and capacitor 58 to the grid 49 of the triode 47 so that when a negative-going pulse is received at the minus count input jack 12, it will cause the potential of the grid 49 to change in a negative direction to ultimately cause the triode 47 to cut-off and the triode 46 to conduct. This will cause the pulse generator 19 to operate in a manner to be described and when the minus scaler 16 recycles, a negative-going pulse will be applied from the output of the scaler 16 through a capacitor 67 and a resistor 68 to the grid 48 of the triode 46. This will cause the triode 46 to be cut-off and the triode 47 to conduct to restore the switch 20 to its initial condition and discontinue operation of the pulse generator 19.

The pulse generator 19 is in the form of a blocking oscillator including a triode 69 having a cathode 70 a grid 71 and a plate or anode 72. The cathode 70 is connected to ground through the parallel combination of a resistor 73 and a capacitor 74 and is also connected through a resistor 75 to a circuit point 76 which may be connected to a source of high positive potential relative to ground. The plate 72 is connected to the circuit point 76 through the primary 77 of a pulse transformer 78 having a secondary winding 79 one terminal which is connected to ground with the other terminal thereof connected through a capacitor 80 to the grid 71, the grid 71 being also connected through a resistor 81 to ground.

The transformer 78 has an output winding 82 having one terminal connected to ground with the other terminal thereof connected through capacitors 83 and 84 to the grids 29 and 30 of the driver tubes 31 and 32, so that the pulse generator 19 functions to apply pulses to the grids of both drivers and hence to both of the scalers 15 and 16.

As previously indicated, the pulse generator 19 is cut-off when the triode 47 of the switch 20 is conducting. In particular, the grid 71 is connected through a resistor 85 to the plate 53 of the triode 47, so that the grid 71 will be at a positive potential relative to ground which will be higher when the triode 47 is cut-off and lower when the triode 47 is in a conducting state. The cathode 70 is normally at a positive potential by virtue of its connection through the resistor 75 to the circuit point 76 at a high potential relative to ground, and the values of the resistors is such that the oscillator tube 69 will be cut-off when the tube 47 is in a conducting state.

As described above in connection with Figure 1 the pulse stretchers 21 and 22 function to momentarily discontinue operation of the pulse generator 19 when either a plus count or a minus count is received. In particular, the grid 71 of the pulse generator oscillator is connected through a resistor 86 to a circuit point 87 which is connected through a capacitor 88 to ground. The circuit point 87 is connected to the plates 89 and 90 of a pair of diodes 91 and 92 having cathodes 93 and 94 respectively connected to the plus and minus count input jacks 11 and 12. The cathodes 93 and 94 are normally biased positively to a potential higher than the normal potential of the grid 71, to prevent conduction through the diodes 91 and 92. For this purpose, the cathodes 93 and 94 are respectively connected through resistors 95 and 96 to ground and through resistors 97 and 98 to a circuit point 99 which is connected through a resistor 100 to a circuit point 101 which is connected to a source of relatively high positive potential relative to ground. When a negative-going pulse is applied at either of the inputs, the cathode of one or the other of the diodes 91 and 92 will drop below the normal potential of the circuit point 87 to change the charge of the capacitor 88 and so lower the potential of the grid 71 as to prevent operation of the oscillator. At the end of the input pulse, the capacitor 88 will not be immediately restored to its initial condition due to the provision of the diodes 91 and 92 The values of the resistors 85 and 86 are such compared to the capacitance of the capacitor 88 that it will take a certain interval of time for the capacitor 88 to be restored to its normal condition of charge. Accordingly, the blocking oscillator will be cut-off for a time interval sufficient for application of the pulses to the scalers.

It may be noted that in addition to preventing rapid discharge of the capacitor 88, to the diodes 91 and 92 isolate the plus and minus count inputs.

If it is desired to cause the subtraction operation only on command, rather than automatically, a switch 102 may be actuated to disconnect the resistor 65 from the minus count input jack 12, and to connect it instead to a junction between one end of a resistor 102*a* and one contact of a normally open switch 102*b*, such as a normally open push button switch, the other contact of which is grounded. The other end of the resistor 102*a* is connected to the circuit point 102*c* at a high potential relative to ground.

Thus, when switch 102 is in the command position (switched to the left in Figure 2) the subtracting function may be initiated by momentarily closing switch 102*b*. This occurs by virtue of the negative going step applied to resistor 65, which in turn causes the binary switch 20 to operate to start operation of the pulse generator which continues until the output pulse is applied to the switch 20 on recycling of the scaler 16. The command signal may also be a pulse from any other source rather than a manual operation.

By way of illustrative example and not by way of limitation, the various resistors and capacitors may have values as listed below.

*Resistors*

| Reference No.: | Value (thousands of ohms) |
|---|---|
| 24 | 6.8 |
| 26 | 6.8 |
| 33 | 10 |
| 34 | 10 |
| 37 | 1 |
| 54 | 10 |
| 56 | 100 |
| 57 | 220 |
| 59 | 100 |
| 60 | 220 |
| 62 | 47 |
| 63 | 47 |
| 65 | 22 |
| 68 | 47 |
| 73 | 10 |
| 75 | 330 |
| 81 | 47 |
| 85 | 250 |
| 86 | 22 |
| 95 | 47 |
| 96 | 47 |
| 97 | 100 |
| 98 | 100 |
| 100 | 270 |

*Capacitors*

| Reference No.: | Value (micromicrofarads) |
|---|---|
| 23 | 22 |
| 25 | 22 |
| 38 | 10,000 |
| 55 | 10,000 |
| 58 | 50 |
| 61 | 50 |
| 66 | 50 |
| 67 | 120 |
| 74 | 10,000 |
| 80 | 47 |
| 83 | 22 |
| 84 | 22 |
| 88 | 120 |

The diodes 27 and 28 may be type 1N34; the triodes 31 and 32 may be in a common envelope as a 12AT7 tube; the triodes 46 and 47 may likewise be a 12AT7 tube; the triode 69 may be formed by one-half of a 12AT7 tube; and the diodes 90 and 91 may be a 6AL5 tube. The constants may be chosen such as to operate the oscillator at a repetition rate of about 150 kilocycles. With this arrangement, it is possible to obtain extremely rapid operation.

Figure 3 is a block diagram of an arrangement utilizing the subtraction system of this invention to transfer a number from one independent scaler to another. In this arrangement, an input jack 103 is connected to the input of a delay circuit 104 the output of which is connected to a first scaler 105. A pulse generator 106 has its output connected through the input of the scaler 105 and also to the input of a scaler 107, and in addition through a gate circuit 108 to the input of a scaler 109. Recycling pulses from the scalers 105 and 107 are applied to a binary switch 110 which controls operation of the gate circuit 108. The pulse generator 106 is controlled by a binary switch 111 which is controlled by manually operated means such as a switch 112 and also by a recycling pulse from the scaler 107.

In operation, the scaler 105 responds to pulses applied at the input jack 103. When it is desired to transfer a number stored on the scaler 105 to a scaler 109, the switch 112 may be actuated to operate the binary switch 111 and cause operation of the pulse generator 106 which applies pulses to the inputs of the scalers 105 and 107 until the scaler 107 recycles. The gate 108 prevents transmission of pulses from the generator 106 to the input of the scaler 109 until the scaler 105 recycles to apply a signal to the binary switch 110 which controls the gate circuit 108, the gate 108 being restored to its initial condition when an output pulse is received by the switch 110 from the scaler 107. If, for example, the scalers 105, 107 and 109 have capacities of 999, and if a number 400 is stored by the scaler 105, the switch 112 may be closed to cause the transfer operation. The pulse generator 106 operates until the scaler 107 recycles and hence applies 1,000 pulses, the scaler 107 initially having no number stored therein. After 600 of the 1,000 pulses are applied to the scaler 105, it will recycle to develop an output pulse applied to the binary switch 110 to cause operation of the gate circuit 108. The remaining 400 of the 1,000 pulses will thus be applied to the scaler 109. Accordingly, after this operation, the independent scaler 109 will store the number initially stored by the scaler 105 which may be restored to its initial condition.

To prevent interference with signals may be received, a pulse stretcher circuit 113 may be connected between the input 103 and the pulse generator 106, the delay circuit 104 serving the same function as in the circuit of Figures 1 and 2 described above. The pulse generator, the binary switches and the delay circuit, as well as the pulse stretcher, may have the same form as in the circuit of Figures 1 and 2 described above. The gate circuit 108 may be of any conventional form. It may also be noted that driver stages may, of course, be applied in front of the scalers 105, 107 and 109.

It will be understood that modifications and variations may be effected without departing from the spirit and scope of the novel concepts of this invention.

I claim as my invention:

1. In a computer system, a pair of scalers, a pulse generator having an output connected to the inputs of both of said scalers, a binary switch for controlling operation of said pulse generator, means for applying a signal to said switch for initiating operation of said pulse generator, one of said scalers having a recycling pulse output, and means coupling said recycling pulse output of said one of said scalers to said switch to discontinue operation of said pulse generator, whereby the other scaler will indicate the number initially stored therein minus the number initially stored in said one scaler.

2. In a computer system, an input circuit arranged to be coupled to a source of pulses to be counted, a scaler having an input coupled to said input circuit, a pulse generator having an output coupled to said scaler input, control means for temporarily preventing application of pulses from said pulse generator to said scaler, and means interconnecting said input circuit and said control means and arranged to initiate operation of said control means in response to application of a pulse to said input circuit.

3. In a computer system, an input circuit arranged to be coupled to a source of pulses to be counted, a scaler having an input coupled to said input circuit, a pulse generator having an output coupled to said scaler input, control means for temporarily preventing application of pulses from said pulse generator to said scaler, means interconnecting said input circuit and said control means and arranged to initiate operation of said control means in response to application of a pulse to said input circuit, and a delay circuit interconnected between said input circuit and said scaler for delaying application of pulses from said input circuit to said scaler for a time interval of sufficient length to insure operation of said control means.

4. In a computer circuit, plus and minus count input circuits, plus and minus scalers having inputs respectively coupled to said plus and minus count input circuits, a pulse generator arranged to apply pulses to the inputs of both of said scalers, said minus count scaler having a recycling pulse output, and means responsive to said recycling pulse output of said minus count scaler for discontinuing operation of said pulse generator.

5. In a computer circuit, plus and minus count input circuits, plus and minus scalers having inputs respectively coupled to said plus and minus count input circuits, a pulse generator arranged to apply pulses to the inputs of both of said scalers, means for initiating operation of said pulse generator as desired, said minus count scaler having a recycling pulse output, and means responsive to said recycling pulse output of said minus scaler for discontinuing operation of said pulse generator.

6. In a computer circuit, plus and minus count input circuits, plus and minus scalers having inputs respectively coupled to said plus and minus count input circuits, a pulse generator arranged to apply pulses to the inputs of both of said scalers, means responsive to a signal at said minus count input for initiating operation of said pulse generator, said minus count scaler having a recycling pulse output, and means responsive to said recycling pulse output of said minus scaler for discontinuing operation of said pulse generator.

7. In a computer circuit, plus and minus count input circuits, plus and minus scalers having inputs respectively coupled to said plus and minus count input circuits, a pulse generator arranged to apply pulses to the inputs of both of said scalers, means for initiating operation of said pulse generator as desired, means responsive to a signal at said minus count input for initiating operation of said pulse generator, said minus count scaler having a recycling pulse output and means responsive to said recycling pulse output of said minus scaler for discontinuing operation of said pulse generator.

8. In a computer circuit, plus and minus count input circuits, plus and minus scalers having inputs respectively coupled to said plus and minus count input circuits, a pulse generator arranged to apply pulses to the inputs of both of said scalers, said minus count scaler having a recycling pulse output, means responsive to said recycling pulse output of said minus count scaler for discontinuing operation of said pulse generator, control means for temporarily preventing application of pulses from said pulse generator to said scalers, and means interconnecting said input circuits and said control means and arranged to initiate operation of said control means in response to application of a pulse to either of said input circuits.

9. In a computer circuit, plus and minus count input circuits, plus and minus scalers having inputs respectively coupled to said plus and minus count input circuits, a pulse generator arranged to apply pulses to the inputs of both of said scalers, said minus count scaler having a recycling pulse output, means responsive to said recycling pulse output of said minus count scaler for discontinuing operation of said pulse generator, control means for temporarily preventing application of pulses from said pulse generator to said scalers, means interconnecting said input circuits and said control means and arranged to initiate operation of said control means in response to application of a pulse to either of said input circuits, and a pair of delay circuits interconnected between said input circuits and said scalers for delaying application of pulses from said input circuits to said scalers for a time interval of sufficient length to insure operation of said control means.

10. In a computer system, an input circuit arranged to be coupled to a source of pulses to be counted, a scaler having an input coupled to said input circuit, a pulse generator having an output coupled to said scaler input, a pulse stretcher circuit coupled to said input circuit, and means coupling said pulse stretcher circuit to said pulse generator for rendering said pulse generator inoperative for a certain time interval when a pulse is applied to said input circuit.

11. In a computer system, an input circuit arranged to be coupled to a source of pulses to be counted, a scaler having an input coupled to said input circuit, a pulse generator having an output coupled to said scaler input, control means for temporarily preventing application of pulses from said pulse generator to said scaler, means interconnecting said input circuit and said control means and arranged to initiate operation of said control means in response to application of a pulse to said input circuit, a differentiating circuit between said input circuit and said scaler input arranged to develop peaks of opposite polarity in response to the leading and trailing edges of the input signal, and means for applying to said scaler input the peak resulting from the trailing edge of the input pulse.

12. In a computer system, an input circuit arranged to be coupled to a source of pulses to be counted, a scaler having an input coupled to said input circuit, a pulse generator having an output coupled to said scaler input, a capacitor, rectifier means for applying a pulse from said input circuit to said capacitor to rapidly change the charge of the same in one direction while preventing rapid change of charge thereof in the reverse direction when the input pulse is discontinued, and means responsive to the charge of said capacitor for rendering said pulse generator inoperative for a certain time interval when a pulse is applied to said input circuit.

13. In a computer circuit, plus and minus count input circuits, plus and minus scalers having inputs respectively coupled to said plus and minus count input circuits, a pulse generator arranged to apply pulses to the inputs of both scalers, means responsive to a recycling pulse output from said minus scaler for discontinuing operation of said pulse generator, a capacitor, a pair of rectifier means for applying pulses from either of said input circuits to rapidly change the charge of said capacitor in one direction and to prevent rapid change of charge thereof in the reverse direction while isolating said input circuits, and means responsive to the charge of said capacitor for temporarily discontinuing operation of said pulse generator in response to signals from either of said inputs.

References Cited in the file of this patent

UNITED STATES PATENTS

| | | |
|---|---|---|
| 2,402,989 | Dickinson | July 2, 1946 |
| 2,403,873 | Mumma | July 9, 1946 |
| 2,672,284 | Dickinson | Mar. 16, 1954 |
| 2,702,367 | Ergen | Feb. 15, 1955 |

OTHER REFERENCES

"High-Speed Computing Devices," ERA, McGraw-Hill Book Co., Inc., 1950, pages 45 to 47 relied on.